United States Patent [19]
Dressler

[11] Patent Number: 5,312,673
[45] Date of Patent: May 17, 1994

[54] ADHESIVE SYSTEM FOR ATHLETIC LETTERING AND THE LIKE

[75] Inventor: Donald R. Dressler, Glastonbury, Conn.

[73] Assignee: Bradford Industries, Inc., Lowell, Mass. ; a part interest

[21] Appl. No.: 921,313

[22] Filed: Jul. 28, 1992

[51] Int. Cl.$^5$ .................................... B32B 9/00
[52] U.S. Cl. .............................. 428/195; 428/913.3; 428/914
[58] Field of Search ............. 428/195, 913.3, 914

[56] References Cited

U.S. PATENT DOCUMENTS 3,987,225 10/1976 Reed et al. ............................ 428/43
4,103,053  7/1978 Barehas ................................ 428/40
5,008,139  4/1991 Ochi et al. ............................ 428/40
5,112,423  5/1992 Liebe ................................... 156/234

OTHER PUBLICATIONS

"Pro Grip" Brochure, Stahls', Inc. Copyright 1988 (1 page).

The Chemistry of Polyurethane Coatings, Mobay Corp. (pp. 1, 3, 7, 9).

Primary Examiner—Patrick J. Ryan
Assistant Examiner—Cathy K. Lee
Attorney, Agent, or Firm—Chilton, Alix & Van Kirk

[57] ABSTRACT

A web (14) and associated method for applying lettering to a fabric substrate (12), having a substantially transparent carrier sheet (16) consisting essentially of a plastic film, or layer (18) of pigmented thermoplastic or thermoset material coated on and peelable from the carrier sheet, and an adhesive layer (20) for bonding the pigmented layer to a water repellant substrate such as nylon. In accordance with one aspect of the invention, the pigmented thermoplastic material is polyurethane and the adhesive system is a composite layer of a solvent-based urethane adhesive coating (26) on the pigmented layer and a water-based urethane adhesive coating (28) on the solvent-based adhesive coating. The water-based coating preferably includes cross-linking agents.

21 Claims, 1 Drawing Sheet

ADHESIVE SYSTEM FOR ATHLETIC LETTERING AND THE LIKE

BACKGROUND OF THE INVENTION

The present invention relates to an adhesive system and associated method for attaching lettering or other graphics to a garment or similar substrate, by the application of heat and pressure.

My co-pending U.S. patent application No. 805,000 filed Dec. 10, 1991 for "Heat Applied Athletic Lettering", describes a layered plastic web that is particularly adapted for attachment of urethane lettering or the like to a garment substrate. A web is fabricated by coating at least one layer of thermoplastic material, preferably pigmented polyurethane, onto a transparent or translucent plastic film, preferably polyester. The resulting web can readily be cut by a computer controlled blade to produce virtually any graphic pattern, including intricate or small letters that may be connected or separated from each other, without penetration of the blade through the carrier sheet. The graphic sheet adheres strongly enough to the carrier sheet, preferably with a peel value in the range of 15-30 ounces, to prevent sliding of the graphic sheet relative to the carrier sheet during cutting, yet permitting release of the carrier sheet after attachment of the graphic by the application of heat and pressure. Thus an "adhesive up" type of web is provided for polyurethane lettering, whereby the graphic can be cut and peeled from the web, and the graphic, while still adhered to the carrier sheet, placed against the fabric. The clarity of the plastic carrier sheet permits exact placement of the letters on the fabric, e.g., on or relative to a shirt pocket.

Despite the significant advance in the art represented by the invention described in said application, neither that invention nor any other lettering system known to the inventor, is capable of easily and reliably attaching lettering or graphics to nylon, satin, canvas, or similar garment substrates that have been treated to resist or repel water, stains, etc. Stahls' Encyclopedia of Heat Applied Lettering, 2nd Ed. Version 2.1 (Library of Congress Registration TXU 133-924) warns on page 12 that Flock lettering will fall off waterproof or even satin jackets, although they appear to stick initially. Promotional materials pertaining to Gerber Heat Transfer Flock, Lextra multicolor velour decoration products, and Hix heat transfer application machines, all carry a warning against attempting to apply plastic lettering material to a nylon or similar substrate.

SUMMARY OF THE INVENTION

It is, accordingly, an object of the invention to provide an adhesive system and method, for attaching "adhesive-up" type plastic lettering or graphics to a wide variety of garment substrates including nylon.

It is a more particular object, to provide a web and associated method for applying lettering to a fabric substrate, having a substantially transparent carrier sheet consisting essentially of a plastic film, a layer of pigmented thermoplastic or thermoset material coated on and peelable from the carrier sheet, and an adhesive layer for bonding the pigmented layers to a water repellant substrate such as nylon.

In accordance with one aspect of the invention, the pigmented thermoplastic material is polyurethane and the adhesive system is a composite layer of a solvent-based urethane adhesive coating on the pigmented layer and a water-based urethane adhesive coating on the solvent-based adhesive coating. The water-based coating preferably includes cross-linking agents.

The preferred water based coating is a polyaromatic isocyanate, heat reactivatable adhesive with a softening point below about 250 degrees F. Preferably, it is the reaction product of an aromatic di-isocyanate, polyol, and amine, with the isocyanates blocked until cross linking is activated upon the application of heat and pressure through the carrier sheet of the web.

In the most effective embodiment presently known to the inventor, the web comprises a clear plastic, preferably polyester base or carrier sheet having a thickness in the range of 0.005-0.010 inch (5-10 mils). A primary, pigmented polyurethane coating of about 1.0 mil dry thickness is carried by the polyester sheet, and will ultimately provide the visible graphics on the garment. A secondary, pigmented polyurethane coating, also of about 1.0 mil dry thickness, provides a backing to the primary coating. Preferably, the backing is white, to improve the opacity of the primary coating in the finished graphics. A solvent-based clear, thermoplastic urethane adhesive is coated on the secondary pigment coat, at dry thickness of about 1.5-2.0 mils. The top or "up" side of the web is in the form of a clear, water based urethane adhesive including blocked cross linkers, having a dry thickness of about 1.0 mil.

The web as described immediately above is preferably formed by solution coating in sequence, each of the two pigmented coatings and each of the two adhesive coatings, onto the carrier sheet. The resulting web has five films in stacked relation, but only three functional layers: (1) the carrier sheet, (2) the pigmented layer, and (3) the adhesive layer.

In a manner described in said co-pending application, the disclosure of which is hereby incorporated by reference, the web of the present invention can be fed through a computer-controlled graphics cutting machine by which desired graphic patterns, such as bands of individual or connected script letters, are cut by a blade. The unwanted portions of the cut web are peeled away, leaving the graphics pattern (in reverse) on the carrier sheet, with the adhesive layer "up". The graphics pattern is accurately placed on the garment while viewing the garment through the carrier sheet. Heat and pressure are applied through the carrier sheet in a conventional manner, whereby the adhesive layer is activated, producing a synergistic bonding among the pigment layer, adhesive layer, and garment. The carrier sheet is then peeled off the pigment layer, leaving a high quality graphics strongly bonded to the garment.

The present invention extends the use of pigmented thermoplastic or thermoset graphics materials, to nylon and other substrates that have previously resisted heat and pressure-activated bonding. However, the adhesive system of the present invention can be used in embodiments other than the five-component web described above. For example, a four-component web would have a plastic carrier sheet, a pigmented layer consisting of a single coating of pigmented thermoplastic or thermoset material to serve as the visible graphic, and the adhesive layer having an optionally pigmented, solvent-based coating on the order of 2.0 mils thick when dry, and the water-based urethane coating on the order of 1.0 mil thick when dry.

The great advantage of the present invention appears to result from the synergistic effect of the water-based adhesive coating serving as a primer on the garment surface, which facilitates bonding by the solvent-based adhesive layer. As far as is known by the inventor, neither water-based urethane adhesives, nor solvent-based urethane adhesives, have successfully bonded graphics to nylon or the like, through the application of heat and pressure. When used together, however, the bonding effect is improved dramatically.

BRIEF DESCRIPTION OF THE DRAWINGS

These and other objects and advantages of the invention will be described more fully below the reference to the accompanying drawings, in which.

DESCRIPTION OF THE PREFERRED EMBODIMENT

Figure 1:
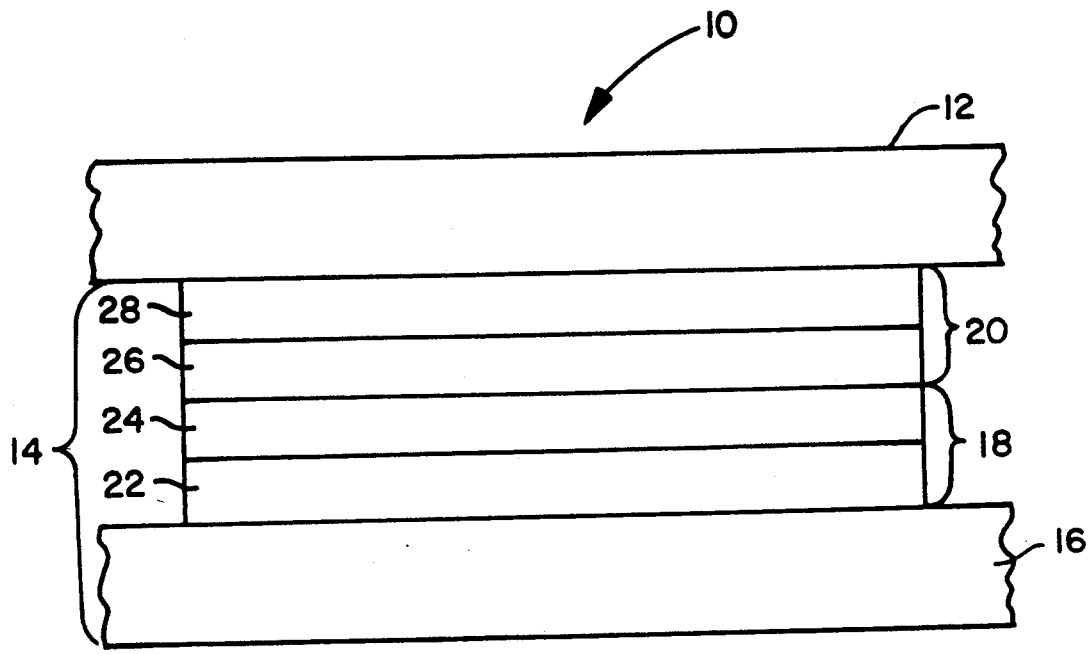
FIG. 1 is a schematic representation of the layers in the preferred web of the present invention.

FIG. 1 shows an athletic lettering system 10 including a garment substrate such as nylon 12, and a so called "adhesive up" athletic lettering web 14 in accordance with a first embodiment of the present invention. In the present description, it should be understood that the term "graphics" and "graphics web" as used hereinafter, include plastic films and webs by which letters, numbers, logos, and other patterns herein generally referred to as "graphics", are secured to a substrate, generally a garment, by the application of heat and pressure.

The graphics web 14 has three functional layers shown as a base layer or carrier sheet 16, a pigment layer 18, which provides the coloration visible on the substrate upon completion of the attachment of the graphic, and an adhesive layer 20 by which the graphic is permanently attached to the garment or substrate 12. The web 14 is shown in FIG. 1, at a point in time after a graphic, for example a letter, has been cut in reverse through the pigment and adhesive layers 18,20, with the unwanted portions peeled or weeded off the carrier sheet 16. The carrier sheet is a relatively strong, preferably clear plastic material, such as a 5-10 mil thick polyester film, which is not cut by the blade (not shown) as the blade cuts the desired graphic pattern. After the pattern has been cut and weeded, the web 14 is placed on the substrate 12 as the operator views the substrate 12 through the substantially clear carrier sheet 16, assuring correct placement of the graphic on the substrate 12.

The pigment layer 18 is a thermoplastic or thermoset material which can be of substantially any type that is conventionally used for athletic lettering purposes. Preferably, the pigment layer consists of at least one, and preferably two coatings 22,24 which will hereinafter be referred to as the primary pigmented coating and the secondary pigmented coating, respectively. The primary pigmented coating 22 is preferably a polyurethane resin containing coloration (referred to hereinafter as "pigmentation"), that is solution coated directly on the carrier sheet 16, at a dry thickness of about 1.0 mil. The coating 22 will, in the completed graphic, be directly visible to the observer, and therefore contains the desired color of the graphic.

The secondary pigmented coating 24, or any additional coatings (not shown), are optional but are preferred when a high quality, high visibility, opaque appearance of the graphic is desired. The secondary coating 24 is preferably also a pigmented polyurethane resin that is solution coated on to the primary coating 24, to a dry thickness of about 1.0 mil. The secondary coating is preferably white, which generally affords the best opacity for the primary coating 22.

It should be appreciated that the primary pigmented coating 22 could alternatively include or consist essentially of, flock material, metalized material, glass beads, or the like, in which case the secondary pigmented coating 24 would be essential for bonding, as will be described below, between the pigment layer 18, the adhesive layer 20, and the garment 12.

The adhesive layer 20 in accordance with the present invention, consists of a primary adhesive coating 26 and a secondary adhesive coating 28, which together define a new and surprisingly synergistic adhesive system. The primary adhesive coating is a solvent based urethane resin that is preferably solution coated directly on the polyurethane coating 24 of the pigment layer 18, to a dry thickness preferably in the range of 1.5-2.0 mils. In the embodiment shown in FIG. 1, where all the color characteristics of the graphic are provided by the primary and secondary pigmented coatings 22,24, the primary adhesive coating 26, (as well as the secondary adhesive coating 28), are preferably clear.

An example of a suitable primary adhesive coating is available as urethane polymer family PS455-200 from Morton International Speciality Chemicals Group, Seabrook, N.H. This material is normally used for extrusion and injection moulding, but has been found by the inventor to be especially useful in the inventive adhesive system. It should be understood, however, that other solvent-based polyurethanes should be satisfactory. Of the polyurethane family identified above, number PS455-204 is preferred. It has a tensile strength of 9600 psi under the ASTM test method D-638, ultimate elongation of 870 under ASTM test method D-412, a melt point range of 125°-175° C. All of the family is a polyester based thermoplastic polyurethane which has excellent compatability with PVC and many other plastics which allow them wide use in polyblends.

The secondry adhesive coating 28 is a water based, aromatic, heat reactivatible adhesive, e.g., a polyaromatic isocyanate. In general, the material is the reaction product of an aromatic di-isocyanate, polyol, and diamine. Such a material is available under the trademark Sancure from Sanncor Industries, Inc., Leominster, Mass. In the particular context of heat and pressure applied lettering, it is preferable that the softening point be less than 250° F. On that basis, Sancure 12249, which has a softening point of 235° F., is the preferred material. Another suitable material, is available under the trademark Dispercoll polyurethane dispersions, from Miles Corp. (formerly Mobay Corporation), Pittsburg, Pa.

It should be appreciated that as used herein, the term "water-based", as distinguishing from "solvent-based", is a term of art used in the field of plastics. It is well known that water-based materials of the type identified herein, usually include a small amount of co-solvent, i.e., less than 10% by total weight. For example, the Sancure 12249 material is approximately 35% solids. Of the balance, about 53% of the total weight is water, 10% a co-solvent (such as 1-mythyl, 2-pyrrolidinone, hereinafter 1-M, 2-P), and about 2% triethyl amine.

Particularly for the adhesive layer or system 20 for use with a graphics web, it is desirable that the heat activation temperature of the second adhesive layer not only be less than 250° F., but that, at the activation temperature, the adhesive effect proceed rapidly and strongly. For this reason, it is preferred to include in the material of the second adhesive coating 28, a cross linker for the water borne urethane, for example blocked polyisocyanates. One example is an HDI based, aliphatic monimer such as available from Mobay Corporation under the trademark Desmodur BL-3175A. This material contains isocyanate groups that are blocked by compounds such as butanone oxime. At room temperature, these blocked isocyanates do not react with polyols at any appreciable rate. At elevated temperatures, however, the blocked isocyanate reacts with the polyol liberating the blocking agent, which is volatile and leaves the coating. This means that one component, room temperature stable coatings can be formulated with blocked isocyanates and suitable polyol compounds.

It is believed that the activation of the cross linker provides a synergistic effect by which the water borne polyurethane material is bonded simultaneously to the substrate 12 and to the primary adhesive coating 26. In other words, it is believed that the secondary adhesive coating 28 acts somewhat as a "primer" on the surface of substrate 12, with the primer effect being maximized by the activation of the cross linker.

Optimum results have been obtained by formulating the second adhesive layer 28, with a ratio of 7 parts of cross linker BL 3175A, with 100 parts Sancure 12249. The cross linker material is about 75% solids and about 25% solvent, e.g., Aromatic 100. The solids content of the block polyisocyanate cross linker, can be up to about 20% of the solids weight of the water-borne urethane adhesive material. Surprisingly, water-based cross linkers, have been found not to be as effective as the solvent-based cross linkers. It should be appreciated that in this preferred embodiment, not only has a surprising result been achieved by using a combination of a solvent-based and water-based adhesive in consecutive adhesive coatings 26,28, but a further surprising result has been achieved as a result of mixing solvent-based cross linkers with the water-based adhesive material in coating 28.

In the context of the web shown in FIG. 1, it is desirable that the web 14 permit the cutting and peeling of relatively fine lines, by the use of auomated cutting machines. This requires that the components of the web exhibit a sufficient degree of adhesion to each other, so as to maintain their stability and positional relationships during cutting and peeling. Sufficient adhesion is achieved between coated films 22 and 24, 24 and 26, and 26 and 28, as a result of the mechanical adhesion arising from the molecular interaction from the "wet", solution coating and subsequent drying of the stacked films. Films 22, 24, 26, and 28 are not peelable from each other. On the other hand, the adhesion between film 22 and carrier sheet 16, must be strong enough to permit precise cutting, but weak enough to permit the peeling away of the unwanted portions of the pigment and adhesive layers 18, 20, in the unwanted portions of the cut web. For this purpose, the preferred polyester material for carrier sheet 16 may be formulated with the inclusion of isocyanates to achieve a degree of adhesion sufficient to sustain the stability of the web during cutting, while permitting peeling after cutting. Of course, the carrier sheet 16 must also be releasable from the pigment layer 18, after the pigment layer has been bonded to the fabric 10 via the melting of adhesive layer 20. During this melting process, the cross linkers in adhesive layer 20 are believed to contribute to the strong bonding of the adhesive layer 20 to the garment 12, as well as the bonding of the pigment layer 18 to the adhesive layer 20.

Figure 2:
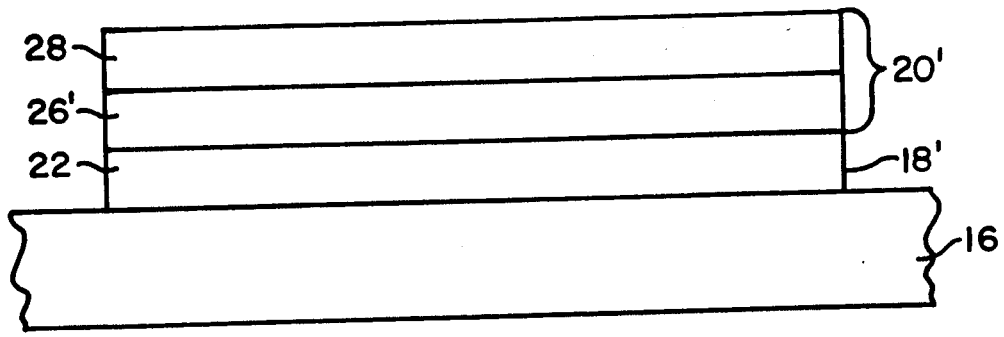
FIG. 2 is a schematic representation of the layers in an alternative web of the present invention.

FIG. 2 depicts an alternative embodiment of the invention, wherein the pigment layer 18' has only one coating 22, which may be the same as coating 22 in the embodiment of FIG. 1. In the embodiment of FIG. 2, the adhesive layer 20'- preferably includes a primary adhesive coating 26' that may be pigmented to some extent, e.g., white, in order to improve the opacity of pigment layer 18', but this result cannot always be satisfactorily accomplished. This is because, generally, the softening or melting point of the pigmented layer 18' is higher than that of the adhesive layer 20'. If the adhesive layer 20' is clear, any melting during the application of heat and pressure will not leave a color residue around the edges of the graphic. If, however, in the embodiment of FIG. 2 some color is included in the primary adhesive coating 26', color leakage may occur around the edges of the graphic.

For this reason, the embodiment of FIG. 2 is not generally capable of providing the vivid graphic coloring available with the embodiment of FIG. 1. If the particular pigment material or color in pigment layer 18' provides sufficient opacity, particularly relative to the color of the substrate 12 to which the graphic will be attached, then it is preferable that the adhesive layer 20' have the same constituent coatings 26,28 as shown in FIG. 1. If vivid color is of paramount importance while graphics edge definiiion is of secondary importance, then the secondary adhesive coating 26' in the embodiment of FIG. 2, may include some pigmentation.

I claim:

1. An adhesive-up web for attaching a thermoplastic or thermoset graphic to a substrate, comprising:
   a plastic carrier sheet;
   a pigment layer having at least one coating of pigmented thermoplastic or thermoset graphic material, said pigment layer being releasably carried by the carrier sheet; and
   an adhesive layer having a primary adhesive coating of solvent based thermoplastic urethane adhesive resin on the pigment layer and a secondary adhesive coating of water-based thermoplastic urethane adhesive resin on the primary adhesive coating.

2. The web of claim 1, wherein the secondary adhesive coating is a heat reactivatable polyaromatic isocyanate with a softening point below about 250° F.

3. The web of claim 2, wherein the secondary adhesive coating includes a blocked isocyanate with a cross linker which activates at approximately said softening point.

4. The web of claim 2, wherein the polyaromatic isocyanate of the secondary adhesive coating is the reaction product of an aromatic di-isocyanate, polyol, and amine.

5. The web of claim 4, wherein the secondary adhesive coating includes blocked cross linkers which activate at approximately said softening point.

6. The web of claim 5, wherein the cross linkers of the secondary coating includes solvent-based blocked cross linkers.

7. The web of claim 1, wherein the carrier sheet and the adhesive layer are substantially clear.

8. The web of claim 7, wherein the pigment layer has a primary pigment coating the color of the graphic, and a secondary pigment coating for enhancing the opacity of the primary pigment coating.

9. The web of claim 8, wherein the secondary pigment coating is white.

10. The web of claim 8, wherein the carrier sheet is clear polyester having a thickness in the range of about 5-10 mils, and each of the pigment and adhesive layer coatings has a dry thickness of about 1-2 mils.

11. The web of claim 8, wherein each layer is formed by solution coating.

12. The web of claim 11, wherein the pigment layer is pigmented polyurethane material.

13. The web of claim 11, wherein the pigment layer is solution coated directly onto the carrier sheet.

14. A thermoplastic adhesive system comprising in combination, a primary adhesive film of solvent-based thermoplastic urethane resin and a secondary adhesive film of water-based thermoplastic urethane resin coated on the primary film.

15. The adhesive system of claim 14, wherein the secondary film includes cross linking agents.

16. The adhesive system of claim 14 wherein the secondary film comprises a heat reactivatable polyaromatic isocyanate.

17. The adhesive system of claim 16, wherein the isocyanate is the reaction product of an aromatic diisocyanate, polyol, and amine.

18. The adhesive system of claim 17, wherein the secondary film includes a blocked cross linking agent which activates at a temperature below about 250° F.

19. The adhesive system of claim 18, wherein the cross linking agent is solvent-based.

20. The web of claim 1, wherein one of said at least one coating of pigmented graphic material is a polyurethane material in direct contact with said adhesive layer.

21. The web of claim 2, wherein one of said at least one coating of pigmented graphic material is a polyurethane material in direct contact with said adhesive layer.

* * * * *